(12) United States Patent
Hyde et al.

(10) Patent No.: US 7,187,290 B2
(45) Date of Patent: *Mar. 6, 2007

(54) RFID READERS AND TAGS TRANSMITTING AND RECEIVING WAVEFORM SEGMENT WITH ENDING-TRIGGERING TRANSITION

(75) Inventors: John D. Hyde, Corvallis, OR (US); Christopher J. Diorio, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/347,734

(22) Filed: Feb. 2, 2006

(65) Prior Publication Data

US 2007/0024446 A1  Feb. 1, 2007

Related U.S. Application Data

(63) Continuation-in-part of application No. 10/915,930, filed on Aug. 10, 2004, now Pat. No. 7,049,964.

(51) Int. Cl.
 *G08B 13/14* (2006.01)

(52) U.S. Cl. ............... 340/572.1; 340/572.4; 340/10.1

(58) Field of Classification Search ............ 340/572.1, 340/572.4, 505, 5.23, 5.25, 5.6, 10.1, 10.3, 340/10.51, 1.52; 235/432, 472.01; 375/336; 704/260; 382/239; 396/550, 551; 700/203
See application file for complete search history.

(56) References Cited

U.S. PATENT DOCUMENTS

| 4,200,369 A | * | 4/1980 | Richards et al. ............ 396/551 |
| 4,324,001 A | | 4/1982 | Rhodes |
| 4,409,621 A | * | 10/1983 | Richards et al. ............ 382/239 |
| 4,692,941 A | | 9/1987 | Jacks et al. |

(Continued)

FOREIGN PATENT DOCUMENTS

EP  0 298 618  1/1989

(Continued)

OTHER PUBLICATIONS

Carley, L. Richard, "Trimming Analog Circuits Using Floating-Gate Analog MOS Memory", IEEE Journal of Solid-State Circuits, vol. 24, No. 6, Dec. 1989, pp. 1569-1575.

(Continued)

*Primary Examiner*—Van T. Trieu
(74) *Attorney, Agent, or Firm*—Thelen Reid Brown Raysman & Steiner LLP; Gregory T. Kavounas (57) ABSTRACT

RFID readers exchange information with RFID tags. The information is encoded for transmission and decoded upon reception. Encoding is in binary bits, which are in turn encoded in waveform segments. The last transmitted waveform incorporates an ending-triggering transition, and terminates in a preset manner with respect to when the ending-triggering transition occurs. Parsing while decoding can happen by waiting for the ending-triggering transition, and then waiting according to the preset manner. This way there is no ambiguity in the ending of the waveform, and no End Frame is necessary.

74 Claims, 8 Drawing Sheets

750 →

| RFID SYMBOL (S) | WAVEFORM SEGMENT (X) | WDL |
|---|---|---|
| "0" | ⎍ | 10-0X0-01-1X1-10 |
| "1" | ⎴ , if there is a next symbol, AND that next symbol is a "0" | 01-1X1-10 |
| | ⎵ , otherwise | 01-1X1-10-0X0-01 |

<u>E-T-MILLER</u>
*(ENDING-TRIGGERING MILLER ENCODING)*

U.S. PATENT DOCUMENTS

| | | |
|---|---|---|
| 4,783,783 A | 11/1988 | Nagai et al. |
| 4,935,702 A | 6/1990 | Mead et al. |
| 5,182,716 A * | 1/1993 | Stroud, III et al. ......... 700/203 |
| 5,774,508 A | 6/1998 | Kallman et al. |
| 5,805,632 A | 9/1998 | Leger |
| 5,933,039 A | 8/1999 | Hui et al. |
| 5,939,945 A | 8/1999 | Thewes et al. |
| 5,952,922 A | 9/1999 | Shober |
| 6,130,632 A | 10/2000 | Opris |
| 6,134,182 A | 10/2000 | Pilo et al. |
| 6,222,440 B1 | 4/2001 | Heller |
| 6,266,362 B1 | 7/2001 | Tuttle et al. |
| 6,316,710 B1 | 11/2001 | Lindemann |
| 6,318,636 B1 | 11/2001 | Reynolds et al. |
| 6,320,788 B1 | 11/2001 | Sansbury et al. |
| 6,357,025 B1 | 3/2002 | Tuttle |
| 6,908,034 B2 | 6/2005 | Alleshouse |
| 2002/0167405 A1 | 11/2002 | Shanks et al. |
| 2003/0137403 A1 | 7/2003 | Carrender et al. |
| 2003/0151497 A1 | 8/2003 | Cole et al. |

FOREIGN PATENT DOCUMENTS

| | | |
|---|---|---|
| EP | 1 324 507 | 7/2003 |
| WO | 01 73854 | 10/2001 |

OTHER PUBLICATIONS

Jonietz, Erika, "Tracking Privacy", Technology Review, Jul./Aug. 2004, pp. 74-75.

Raszka et al., "Embedded Flash Memory for Security Applications in a 0.13 µm CMOS Logic Process", Digest of Technical Papers, IEEE International Solid-State Circuits Conference 2004, p. 46.

Weis, Stephen A., et al., Security and Privacy Aspects of Low-Cost Radio Frequency Identification Systems, Laboratory for Computer Science, Auto-ID Center, Massachusetts Institute of Technology, pp. 1-12.

Yoshida, Junko, "RFID "kill" Feature Aims to Soothe Privacy Fears", EE Times, Apr. 28, 2003, pp. 1, 86.

International Search Report, for International Application No. PCT/US2005/028180, date mailed Dec. 14, 2005.

* cited by examiner

| RFID SYMBOL (S) | WAVEFORM SEGMENT (X) | WDL |
|---|---|---|
| "0" | ⎍ | 10-0X0-01-1X1-10 |
| "1" | ⎍ , if there is a next symbol, AND that next symbol is a "0" | 01-1X1-10 |
| | ⎍ , otherwise | 01-1X1-10-0X0-01 |

*E-T-MILLER*
*(ENDING-TRIGGERING MILLER ENCODING)*

| RFID SYMBOL (S) | WAVEFORM SEGMENT (Z) | WDL |
|---|---|---|
| "0" | ⊓_ | 1S1-10-0X0-01 |
| "1" | ⎍ | 1L1-10-0X0-01 |

*E-T-PIE*
*(ENDING-TRIGGERING*
*PULSE INTERVAL ENCODING)*

RFID READERS AND TAGS TRANSMITTING AND RECEIVING WAVEFORM SEGMENT WITH ENDING-TRIGGERING TRANSITION

CROSS-REFERENCE TO RELATED APPLICATIONS

This application is a continuation-in-part of U.S. patent application Ser. No. 10/915,930 in the names of inventors John D. Hyde and Christopher J. Diorio, filed on Aug. 10, 2004, now U.S. Pat. No. 7,049,964 and commonly assigned herewith.

FIELD OF THE INVENTION

The present invention is related to the field of Radio Frequency IDentification (RFID) systems, and more specifically to RFID readers, tags, software and methods for encoding and decoding RFID transmissions such that the symbols indicate their own ending.

BACKGROUND

Radio Frequency IDentification (RFID) tags can be used in many ways for locating and identifying objects to which they are attached. RFID tags are particularly useful in product-related and service-related industries for tracking large numbers of objects are being processed, inventoried, or handled. In such cases, an RFID tag is usually attached to individual items, or to their packages.

In principle, RFID techniques entail using a device called an RFID reader to interrogate one or more RFID tags. Interrogation is performed by the reader transmitting a Radio Frequency (RF) wave. A tag that senses the interrogating RF wave responds by transmitting back another RF wave, a process known as backscatter. Backscatter may take place in a number of ways. The response may further encode a number stored internally in the tag. The response, and the number if available, is decoded by the reader, which thereby identifies, counts, or otherwise interacts with the associated item. The number can denote a serial number, a price, a date, a destination, other attribute(s), any combination of attributes, and so on.

An RFID tag typically includes an antenna system, a power management section, a radio section, a logical section, and a memory. Advances in semiconductor technology have miniaturized the electronics so much that an RFID tag can generate the backscatter while powered by only the RF signal it receives, enabling some RFID tags to operate without a battery.

There have been some problems with interpreting transmitted data, which are attributable to their encoding, as is described in more detail below.

SUMMARY

The invention improves over the prior art.

Briefly, the present invention provides RFID readers and RFID tags that exchange information, and software and methods for the same. The information is encoded for transmission and decoded upon reception. Encoding is in binary bits, which are in turn encoded in waveform segments. The last transmitted waveform incorporates an ending-triggering transition, and terminates in a preset manner with respect to when the ending-triggering transition occurs.

The invention offers the advantage that parsing while decoding can happen by waiting for the ending-triggering transition, and then waiting according to the preset manner. This way there is no ambiguity in the ending of the waveform, and no End Frame is necessary.

These and other features and advantages of the invention will be better understood from the specification of the invention, which includes the following Detailed Description and accompanying Drawings.

BRIEF DESCRIPTION OF THE DRAWINGS

The following Detailed Description proceeds with reference to the accompanying Drawings, in which.

DETAILED DESCRIPTION

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. This description is, therefore, not to be taken in a limiting sense.

As has been mentioned, the present invention provides RFID readers and RFID tags that exchange information, and software and methods for the same. The invention is now described in more detail.

Figure 1:
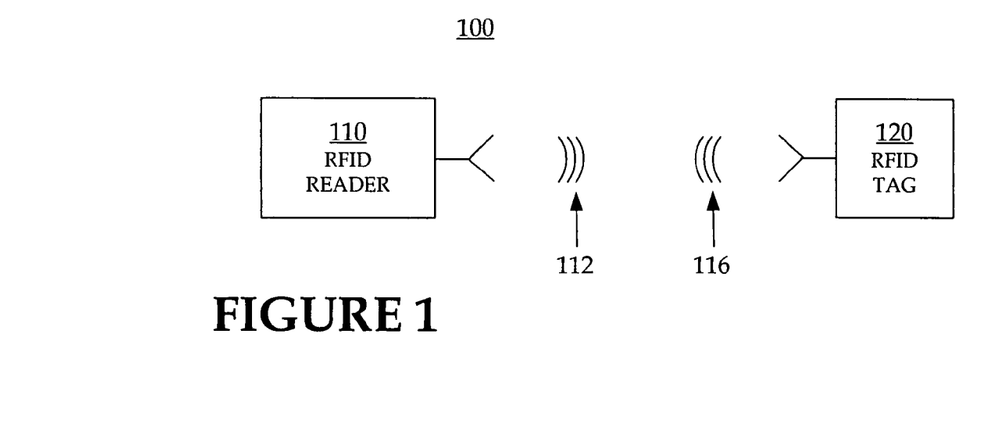
FIG. 1 is a block diagram of an RFID system according to the invention.

FIG. 1 is a diagram of an RFID system 100 according to the invention. An RFID reader 110 made according to the invention transmits an interrogating Radio Frequency (RF) wave 112. An RFID tag 120 made according to the invention in the vicinity of RFID reader 110 may sense interrogating RF wave 112, and generate backscatter signal 116 in response. RFID reader 110 senses and interprets backscatter signal 116.

Reader 110 and tag 120 exchange data via wave 112 and signal 116. In a session of such an exchange, each encodes and transmits data to the other, and each receives and decodes data from the other. The data is encoded into, and decoded from, RF waveforms, as will be seen in more detail below. The data itself can be binary, such as "0" and "1". For RFID purposes, it has become common to think of the binary data as RFID symbols.

Figure 2:
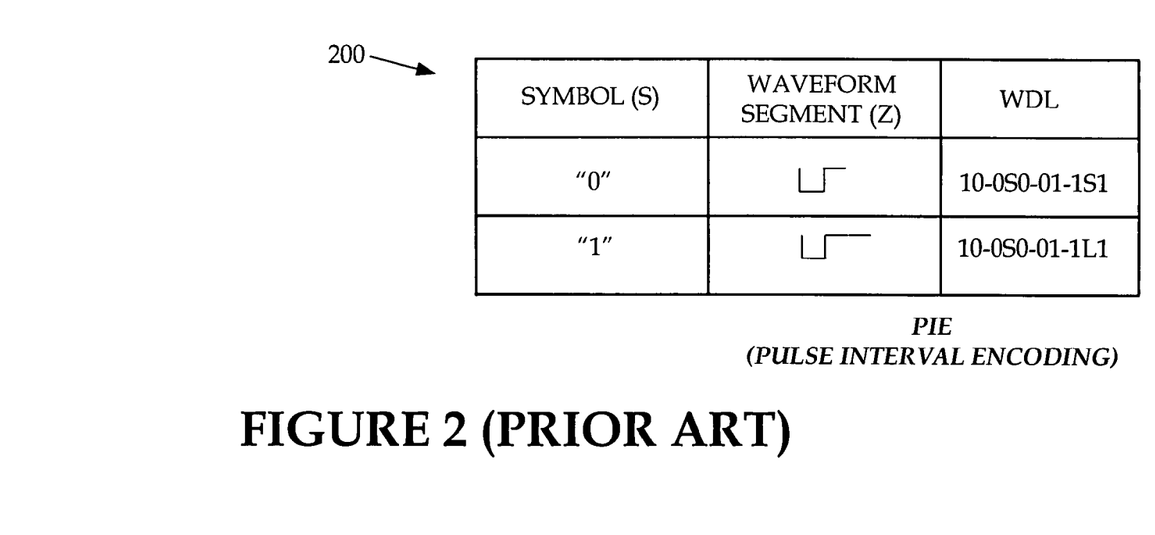
FIG. 2 is a table showing a prior art correspondence between RFID symbols and waveform segments for encoding and decoding the RFID symbols.

FIG. 2 is a table 200 showing a correspondence between RFID symbols and waveform segments. In other words, table 200 shows how RFID symbols became encoded and decoded in the prior art into corresponding waveform segments. The correspondence of table 200 is also known as Pulse Interval Encoding (PIE). In table 200, symbol "0" is encoded by a low pulse followed by a high pulse, while symbol "1" is encoded by a low pulse followed by two high pulses.

The high and low pulses can be variations in the amplitude of the RF wave. It should be remembered that tag 120 concurrently harvests the energy of the pulses in wave 112. So, for RFID purposes, a high pulse typically carries the full energy of the RF wave, and even the low pulse may be designed to carry energy, but less than that of the high pulse.

In addition, designating the low pulse as also carrying energy leaves no time intervals when there is no RF transmission.

Also for use in the claims of this document, the following approach or Waveform Descriptive Language (WDL) is additionally used to describe waveforms in the context of the present invention. A high-value is thought of as a "1" and a low-value is thought of as a "0". So, a low-value to high-value transition will be referred to as a "01" and, conversely, a high-value to low-value transition will be referred to as a "10". All "01" and "10" transitions are taken to happen essentially instantaneously.

In addition, a high pulse will be referred to as a "1X1", while a low pulse will be referred to as a "0X0". In these designations, "X" refers to the length or duration of the high pulse or the low pulse. If it is any duration, the letter "X" will itself be used. Accordingly, even within a single waveform that uses the letter "X" twice for two pulses, the two pulses themselves could be of different durations.

If the duration is considered short, the letter "S" will be used instead of the letter "X", while if the duration is long, the letter "L" will be used instead of the letter "X". In this case, "short" and "long" are considered as compared with each other. In addition, short and long will have some reference to one timing or pulse period.

Thus, for example, the "0" symbol of FIG. 2 would be referred to using this WDL approach as a 10-0S0-01-1L1 waveform and the "1" symbol of FIG. 2 would be referred to using WDL as a 10-0S0-01-1L1 waveform. Their difference is the length of the trailing pulse at the end.

The prior art encoding of FIG. 2 is inefficient, as will be described in more detail below.

The full manner of encoding and decoding are now described, also with reference to FIGS. 3A, 3B, 3C, and 3D. It will be understood that encoding by a transmitting device takes place by moving from the representation(s) of FIG. 3A, to those of FIG. 3B and FIG. 3C, and then to those of FIG. 3D. In addition, decoding by a receiving device takes place in the reverse, namely by moving from the representations of FIG. 3D, to those of FIG. 3B and FIG. 3C, and then to that of FIG. 3A.

Figure 3A:
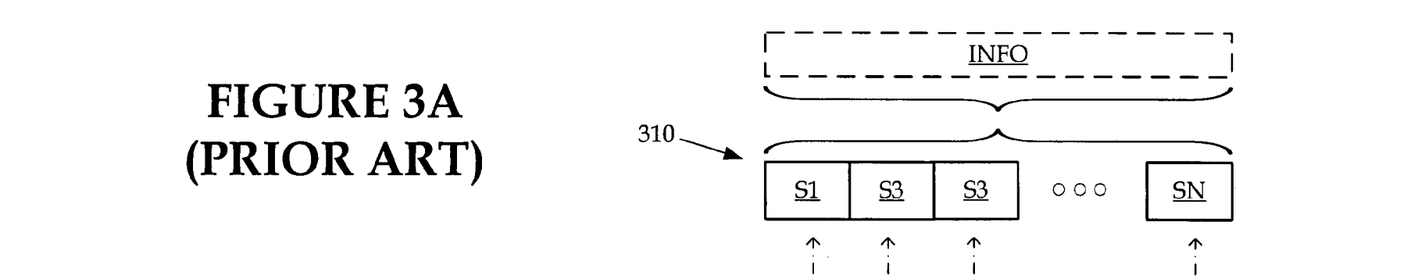
FIG. 3A is a block diagram indicating how information may be encoded into, and decoded from, RFID symbols.

FIG. 3A is a block diagram indicating how information may be encoded into, and decoded from, RFID symbols. An information block INFO becomes encoded into a group 310 of RFID symbols S1, S2, S3, . . . , SN. Group 310 is preferably provided as a series, where S1 is the first symbol and SN is the last symbol. Information block INFO may be data, commands, and so on. RFID symbols S1, S2, S3, . . . , SN may include binary data such as "0", and "1".

Figure 3B:
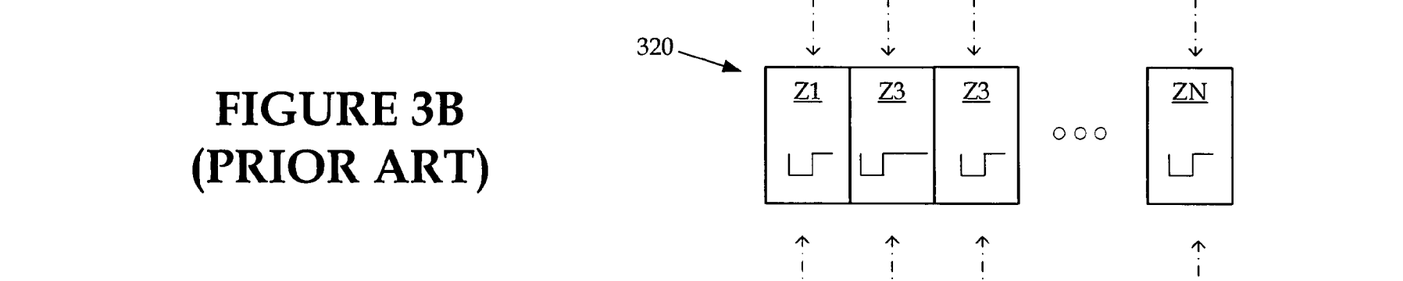
FIG. 3B is a block diagram of a group of waveform segments that correspond to the symbols of FIG. 3A according to the prior art correspondence of FIG. 2, and are implemented in a waveform of FIG. 3D.

FIG. 3B is a block diagram of a group 320 of waveform segments Z1, Z2, Z3, . . . , ZN. Group 320 is preferably provided as a series, where Z1 is the first segment and ZN is the last segment. Each of segments Z1, Z2, Z3, . . . , ZN corresponds to each of symbols S1, S2, S3, . . . , SN of group 310 in FIG. 3A. The correspondence is as given in table 200 of FIG. 2. In addition, waveform segments Z1, Z2, Z3, . . . , ZN can also stand for other codes, such as specific violations of these transmissions, and so on.

Figures 3C, 3D:
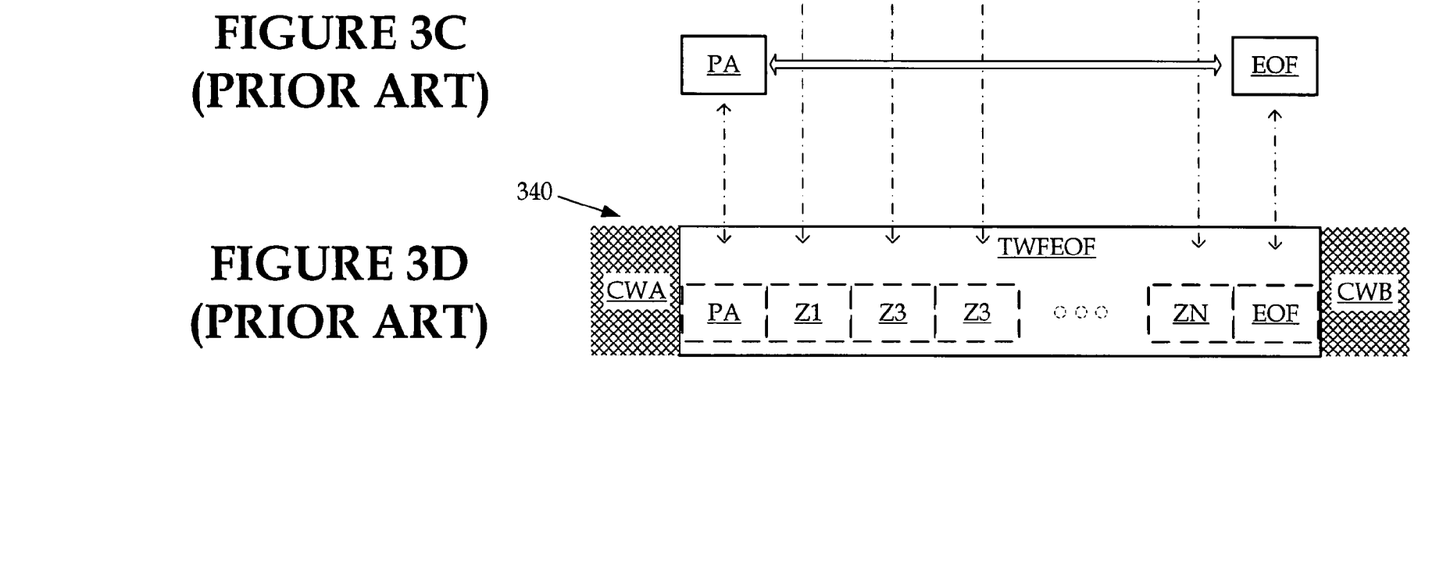
FIG. 3C is a block diagram indicating additional waveform segments for combining with the segments of FIG. 3B for implementing the waveform of FIG. 3D.
FIG. 3D is a block diagram of a transmitted or received wave, and whose information component has a waveform made from the waveform segments of FIG. 3B and FIG. 3C.

FIG. 3C is a block diagram indicating additional waveform segments for a preamble PA and an End Frame EOF. Preamble PA can be a prearranged sequence of waveform segments, to indicate the start of a transmission and also optionally other parameters. End Frame EOF can be a prearranged sequence of waveform segments, to indicate the end of a transmission.

FIG. 3D is a block diagram indicating a transmitted or received wave 340. Wave 340 starts with a continuous wave (CW) segment CWA, and ends with a CW segment CWB. Between segment CWA and segment CWB, there is a wave TWFEOF for transmitting the information of block INFO, and has a total waveform related to the waveform segments of FIG. 3B and FIG. 3C. In particular, wave TWFEOF includes preamble PA, segments Z1, Z2, Z3, . . . , ZN of group 320, and End Frame EOF.

From FIG. 3D, it becomes apparent that transmitting and receiving End Frame EOF lengthens transmitting and receiving wave TWFEOF, without communicating any information, such as of block INFO of FIG. 3A. This is inefficient, because lengthening wave TWFEOF slows down communication.

Transmitting and receiving End Frame EOF is used for indicating that the last segment ZN has been transmitted. It is necessary, so as to enable parsing at the decoding stage, as is explained below by demonstrating what happens if End Frame EOF were hypothetically omitted.

Figure 4A:
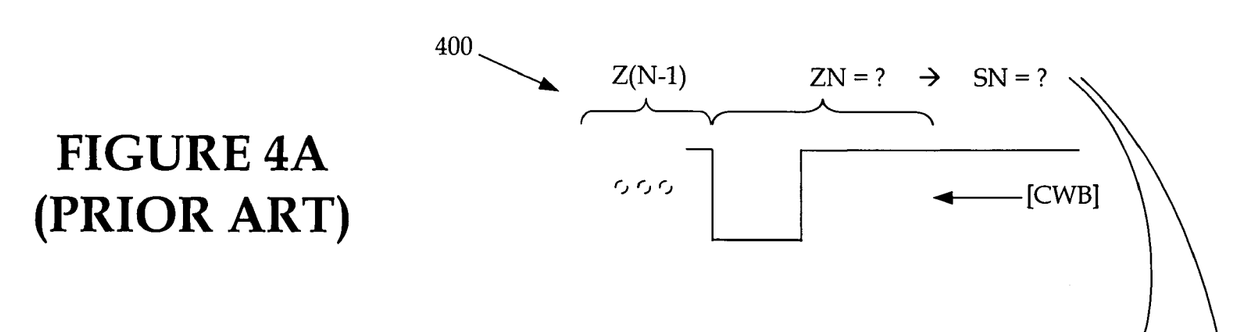
FIG. 4A is a diagram of an actual waveform of a portion of the waveform of FIG. 3D that further hypothetically omits an End Frame of FIG. 3D, and which is therefore ambiguous to interpret.

FIG. 4A illustrates why transmitting and receiving End Frame EOF is necessary for the prior art. FIG. 4A shows a waveform 400 of the block diagram of FIG. 3D, where End Frame EOF is hypothetically omitted. Waveform 400 ends after transmitting the last two waveform segments Z(N-1), ZN, and then a CW denoted as CWB.

The ending of waveform 400 is ambiguous to interpret. In the correspondence of FIG. 2, both symbols "0" and "1" are encoded with a waveform that ends in a high pulse. That high pulse, as transmitted, is indistinguishable from CW CWB. The question becomes, where does ZN end, and where does CWB begin? This ought to determine the last symbol SN from the last waveform segment ZN. Two contradictory interpretations are presented below.

Figure 4B:
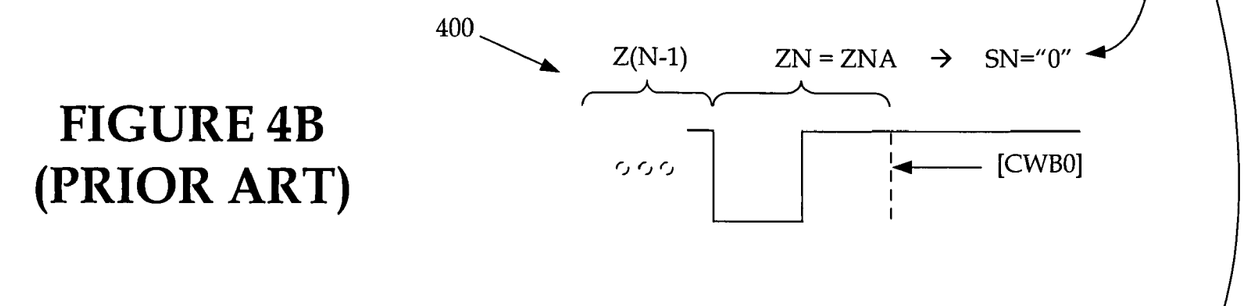
FIG. 4B illustrates a first possible interpretation of the waveform of FIG. 4A.

FIG. 4B illustrates a first possible interpretation of the waveform of FIG. 4A. The CW starts where CWB0 starts, the last waveform segment ZN equals to ZNA, and that means that the last symbol SN is "0".

Figure 4C:
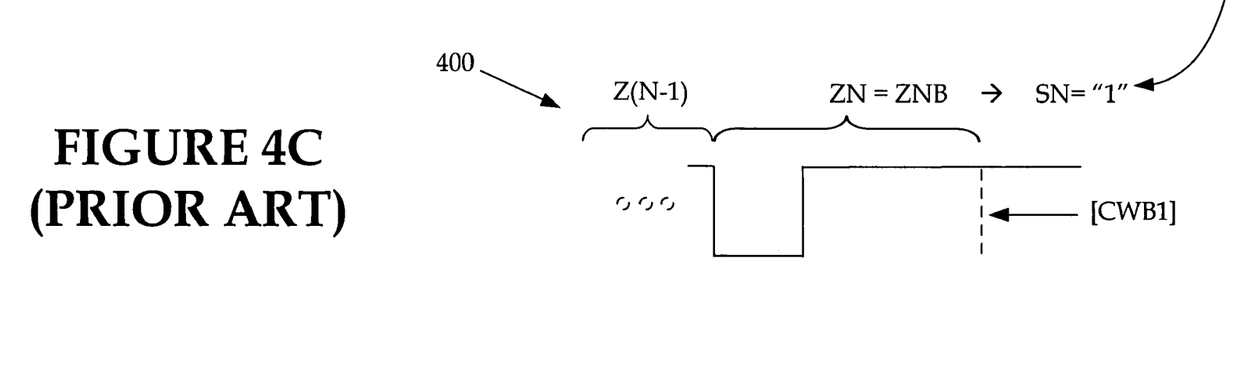
FIG. 4C illustrates a second possible interpretation of the waveform of FIG. 4A that contradicts the interpretation of FIG. 4B.

FIG. 4C illustrates a second possible interpretation of the waveform of FIG. 4A. The CW starts where CWB1 starts, the last waveform segment ZN equals to ZNB, and that means that the last symbol SN is "1", which contradicts the interpretation of FIG. 4B.

The ambiguity in the interpretation of SN cannot be resolved between FIG. 4B and FIG. 4C. Accordingly, End Frame EOF is necessary to use, so as to enable parsing at the decoding stage.

The present invention is now described in more detail. As will be appreciated, the present invention renders the End Frame EOF of FIGS. 3C, 3D not necessary, without permitting the ambiguity of FIG. 4A.

Referring back to FIG. 1, the present invention includes components of an RFID system 100, such as readers 110 and tags 120. The invention addresses transmissions either from reader 110 to tag 120, or from tag 120 to reader 110, or both. In both instances there is encoding, transmitting, receiving and decoding of information.

The full manners of encoding and decoding according to the invention are now described. The description is with reference to FIGS. 5A, 5B, 5C, and 5D, sometimes in a similar manner to the description referencing FIGS. 3A, 3B, 3C, and 3D.

Figure 5A:
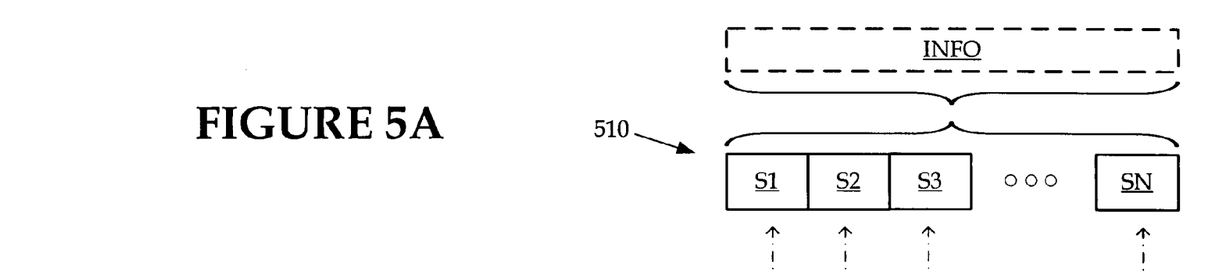
FIG. 5A is a block diagram indicating how information may be encoded into symbols, similarly to FIG. 3A.

FIG. 5A is a block diagram indicating how information may be encoded into, and decoded from, RFID symbols. It will be recognized that FIG. 5A is very similar to FIG. 3A. An information block INFO becomes encoded into a group 510 of RFID symbols S1, S2, S3, . . . , SN. Group 510 is preferably provided as a series, where S1 is the first symbol and SN is the last symbol. Information block INFO may be data, commands, and so on.

Figure 5B:
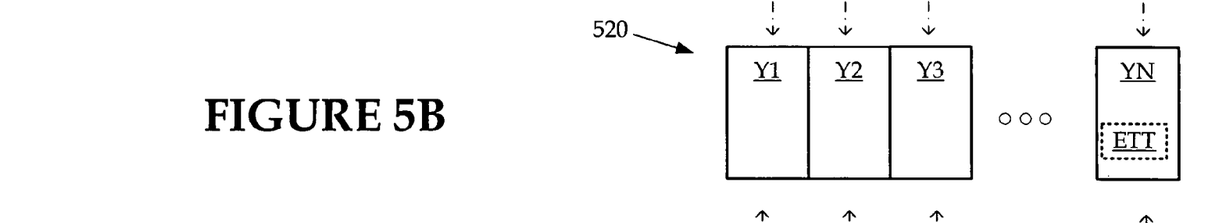
FIG. 5B is a block diagram of a group of waveform segments according to the present invention that correspond to the symbols of FIG. 5A, and are implemented in a waveform of FIG. 5D.

FIG. 5B is a block diagram of a group 520 of waveform segments Y1, Y2, Y3, . . . , YN according to the invention. Group 520 is preferably provided as a series, where Y1 is the first segment and YN is the last segment. Each of segments Y1, Y2, Y3, YN corresponds to each of symbols S1, S2, S3, . . . , SN of group 510 in FIG. 5A according to the invention. In addition, except waveform YN, some waveform segments Y1, Y2, Y3, . . . , can also stand for other codes, such as specific violations of these transmissions, and so on.

Importantly, last waveform segment YN incorporates an ending-triggering transition ETT, along with optionally other transitions. Transition ETT may be high to low, or low to high. Further, waveform segment YN terminates in a preset manner with respect to the occurrence of ending-triggering transition ETT. The ending-triggering transition ETT and the preset manners of termination will be elaborated on below in more detail.

Further, there are a number of correspondences according to the invention, between RFID symbols and waveform segments. When followed, they will cause waveform segment YN to incorporate ending-triggering transition ETT. When that happens, last segment YN may be parsed without ambiguity, and without needing an End Frame EOF as will be seen below.

Figure 5C:
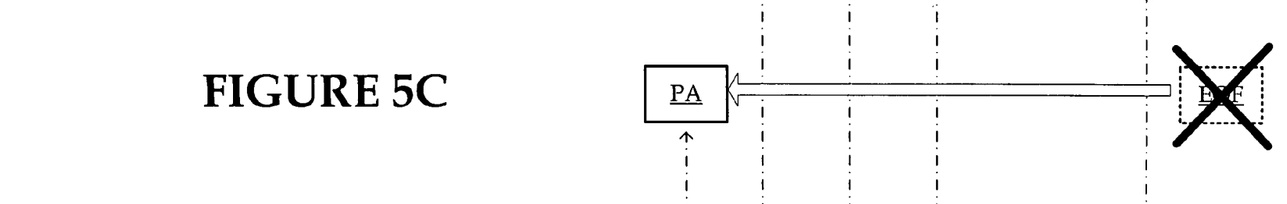
FIG. 5C is a block diagram indicating an additional waveform segment for combining with the segments of FIG. 5B for implementing the waveform of FIG. 5D, according to an embodiment of the invention where the optional and unnecessary EOF frame is not used.

FIG. 5C is a block diagram indicating an additional waveform segment for a preamble PA, which can be implemented similarly to that of FIG. 3C. It will be observed, however, that End Frame EOF of FIG. 3C is here optional and unnecessary.

Figure 5D:
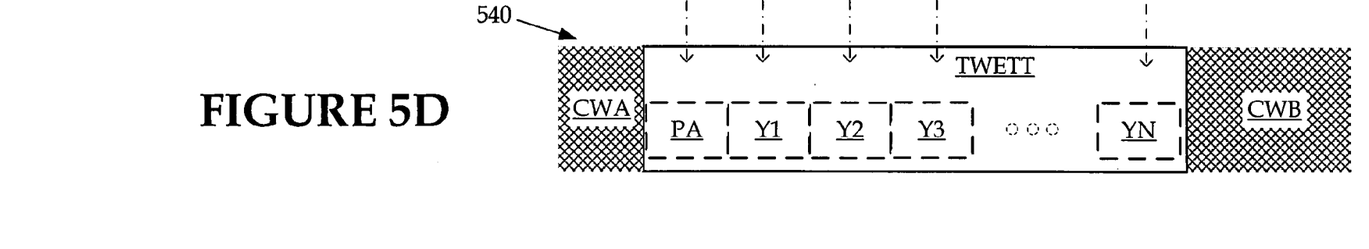
FIG. 5D is a block diagram of a transmitted or received wave, and whose information component having a waveform made from the waveform segments of FIG. 5B and FIG. 5C.

FIG. 5D is a block diagram indicating a transmitted or received wave 540. Wave 540 starts with a CW segment CWA similar to that of FIG. 3D, and ends with a CW segment CWB similar to that of FIG. 3D. Between segment CWA and segment CWB there is a wave TWETT for transmitting the information of block INFO, and has a total waveform made from the waveform segments of FIG. 5B and FIG. 5C. In particular, wave TWETT includes preamble PA, and segments Y1, Y2, Y3, . . . , YN of group 520. A portion of wave TWETT that does not include preamble PA is also called a signal wave.

Importantly, wave TWETT does not includes End Frame EOF. CW segment CWB does not encode information, such as by encoding any RFID symbols. Additionally, CW segment CWB is not in itself an End Frame EOF which would encode the fact that the last segment YN has been transmitted, for purposes of parsing it.

Since wave TWETT does not includes End Frame EOF, it is shorter than wave TWFEOF of FIG. 3C, which permits segment CWB to start faster than it does in FIG. 3C. In turn, this permits faster and more efficient communication of the components in RFID system 100.

The structure of last segment YN of group 520 is now described in more detail. As will be appreciated, there are a number of possibilities for the preset manner in which last segment YN terminates with respect to the occurrence of the ending-triggering transition. The usefulness of the invention is that, during the subsequent parsing, after the decoder receives the ending-triggering transition, it will know that segment YN ends in a certain manner. One such possible manner is that the last segment terminates after a preset number of additional transitions, after the ending-triggering transition occurs.

Other possible manners have to do with the relative timing of the occurrence of the ending-triggering transition with the actual ending of last segment YN. Two such possibilities are described below.

Figure 6A:
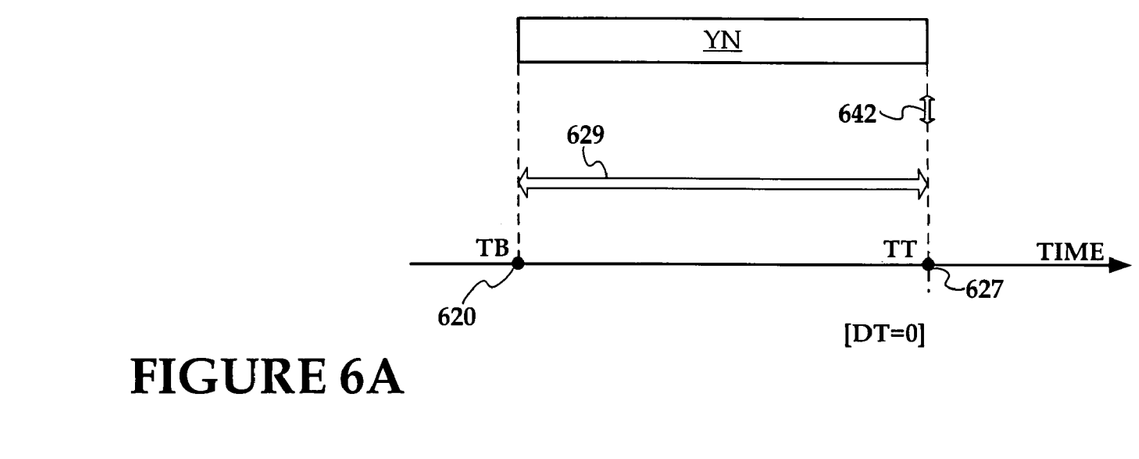
FIG. 6A shows a time representation of a first possible duration of the last segment of FIG. 5B relative to that of its ending-triggering transition.

FIG. 6A shows a time representation of last segment YN, along axis TIME. Segment YN begins at time point TB 620 on axis TIME, and terminates at time point TT 627 on axis TIME. Segment YN thus has a time duration represented by arrow 629. In addition, in FIG. 6A, ending-triggering transition 642 also occurs at time point TT 627. In other words, here the manner is that last segment YN terminates upon the occurrence of ending-triggering transition 642.

Figure 6B:
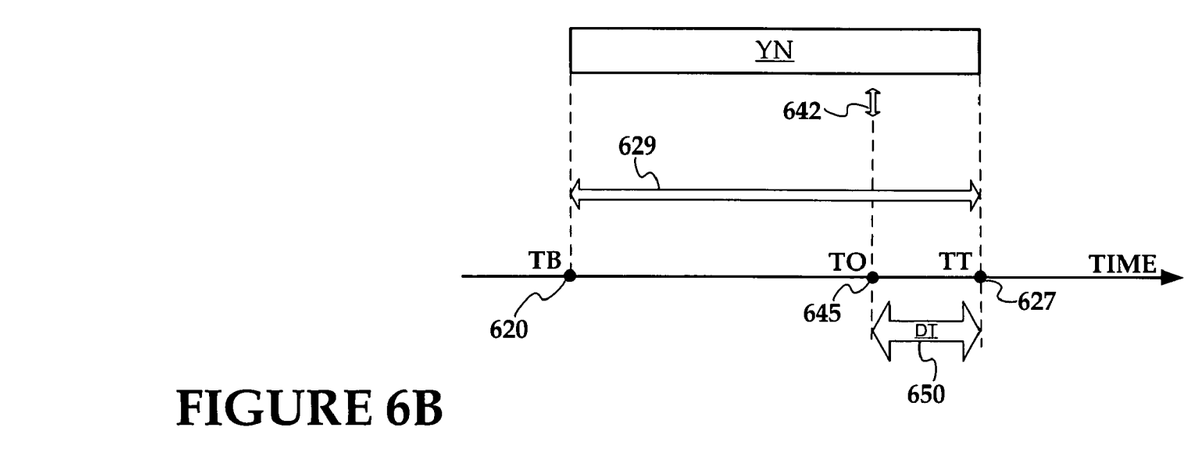
FIG. 6B shows a time representation of a second possible duration of the last segment of FIG. 5B relative to that of its ending-triggering transition.

FIG. 6B shows another time representation of last segment YN, along axis TIME. Segment YN begins at time point TB 620 on axis TIME, and terminates at time point TT 627 on axis TIME. Segment YN thus has a time duration represented by arrow 629. In addition, in FIG. 6B, ending-triggering transition 642 occurs at time point TO 645 on axis TIME. In other words, here the manner is that last segment YN terminates a time interval DT 650 after transition 642 occurs.

Time interval DT 650 can be any preagreed interval, for example a fraction of a symbol period that is also known as bit period. The usefulness in subsequent parsing is that the decoder will know that segment YN ends a time DT after transition 642. It will be observed that, equivalently, interval DT in FIG. 6A is zero.

Since segment YN conveys information encoded in a symbol, and since the same symbol is very likely to have been repeated within group 520, this means that the ending-triggering transition ETT may be incorporated also by at least some of the other segments Y1, Y2, Y3, . . . . of group 520. Two such cases are examined below on more detail.

Figure 7A:
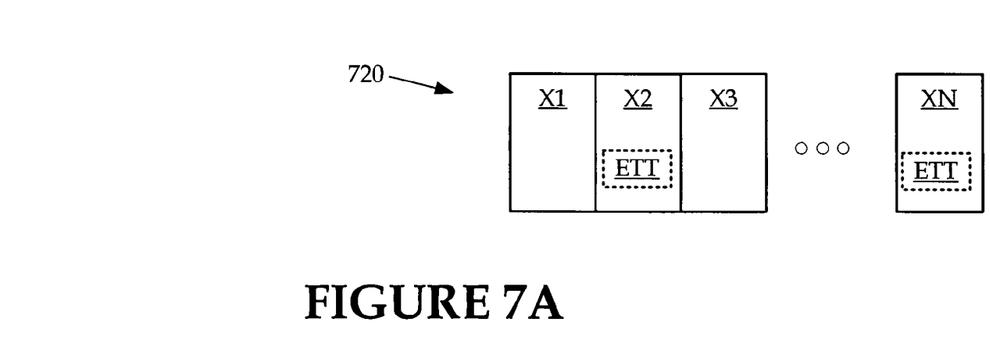
FIG. 7A is a first possible embodiment of the encoded segments of FIG. 5B, where some but not all of them incorporate the ending-triggering transition.

FIG. 7A shows a group 720 of encoded waveform segments X1, X2, X3, XN, similar to those of group 520 according to an embodiment of the invention. In the embodiment of FIG. 7A, all segments X1, X2, X3, . . . , XN belong in a segment set, and at least some but not all of segments X1, X2, X3, . . . , XN in the set incorporate the ending-triggering transition ETT. As with group 520, however, last segment XN in group 720 always incorporates the ending-triggering transition ETT. This way, last segment XN can be decoded with no ambiguity.

There are a number of correspondences that can achieve the result of group 720 according to the invention. In some embodiments, one of the symbols is decoded from different waveform segments depending on whether there is a next symbol. An example is shown immediately below.

Figure 7B:
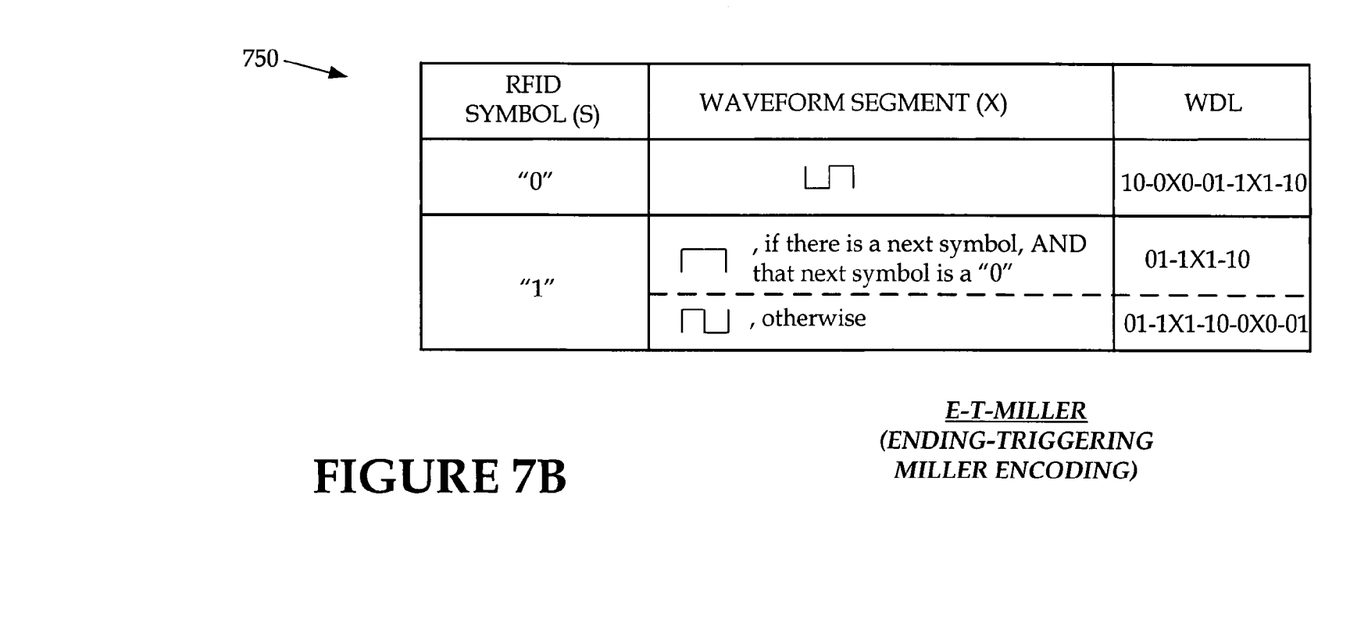
FIG. 7B is a table showing a correspondence according to an embodiment of the invention between symbols such as those of FIG. 5A and waveform segments such as those of FIG. 5B, for encoding and decoding so as to generate the embodiment of FIG. 7A.

FIG. 7B is a table 750 showing a correspondence according to an embodiment of the invention that can achieve the result of group 720. The correspondence of table 750 is also called E-T-MILLER, because it is a variation of Miller encoding according to the invention.

In FIG. 7B, the segment set has three possible waveforms for two possible symbols. While symbol "0" is encoded the same every time, symbol "1" is encoded differently, depending on whether there is a next symbol, and what it is.

For the correspondence of table 750, in one embodiment, only low to high transitions need be monitored. For a "0" it will occur in the middle, and for a "1" at the end of the symbol period.

Thus, the "0" symbol may be described using WDL in accordance with FIG. 7B as 10-0X0-01-1X1-10, and the "1" symbol (where there is a next symbol and the next symbol is a "0") may be described as 01-1X1-10 and, otherwise, it may be described as 01-1X1-10-0X0-01.

Alternately, in another embodiment, the ending-triggering transition can be considered a transition that is in the middle of the bit period. That transition is a low to high for a "0", and a high to low for a "1". A decoder receiving the ending-triggering transition knows to wait another half bit period for the end of the segment, which could be the last segment XN. It is noteworthy that there is no transition in the middle of the bit period, if the symbol is a "1" that is followed by a symbol "0". In other words, that segment does not incorporate a transition that can be considered the ending-triggering transition. That is fine, however, since that "1" could not be the last segment XN.

Figure 8A:
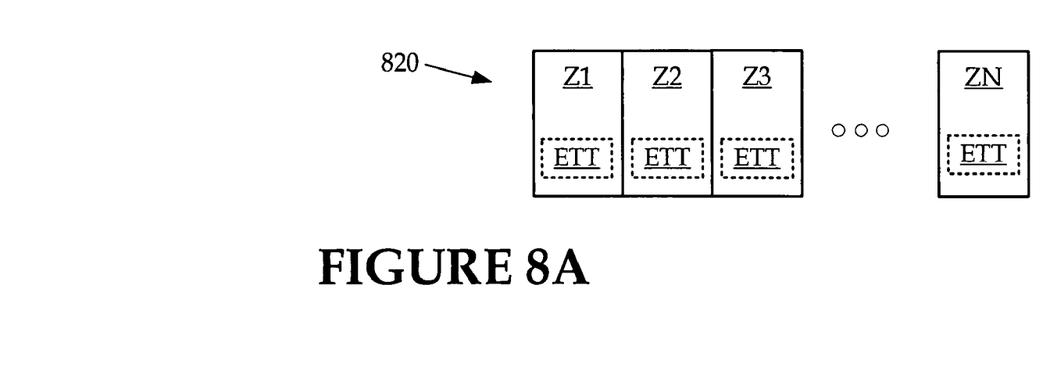
FIG. 8A is a second possible embodiment of the encoded segments of FIG. 5B, where all of them incorporate the ending-triggering transition.

FIG. 8A shows a group 820 of encoded waveform segments Z1, Z2, Z3, ZN, similar to those of group 520 according to an embodiment of the invention. In the embodiment of FIG. 8A, all segments Z1, Z2, Z3, . . . , ZN belong in a segment set, and all segments Z1, Z2, Z3, . . . , ZN in the set incorporate the ending-triggering transition ETT. As with group 520, therefore, last segment ZN in group 820 also incorporates the ending-triggering transition ETT. This way, last segment ZN can be decoded with no ambiguity.

There are a number of correspondences that can achieve the result of group 820 according to the invention. An example is shown immediately below.

Figure 8B:
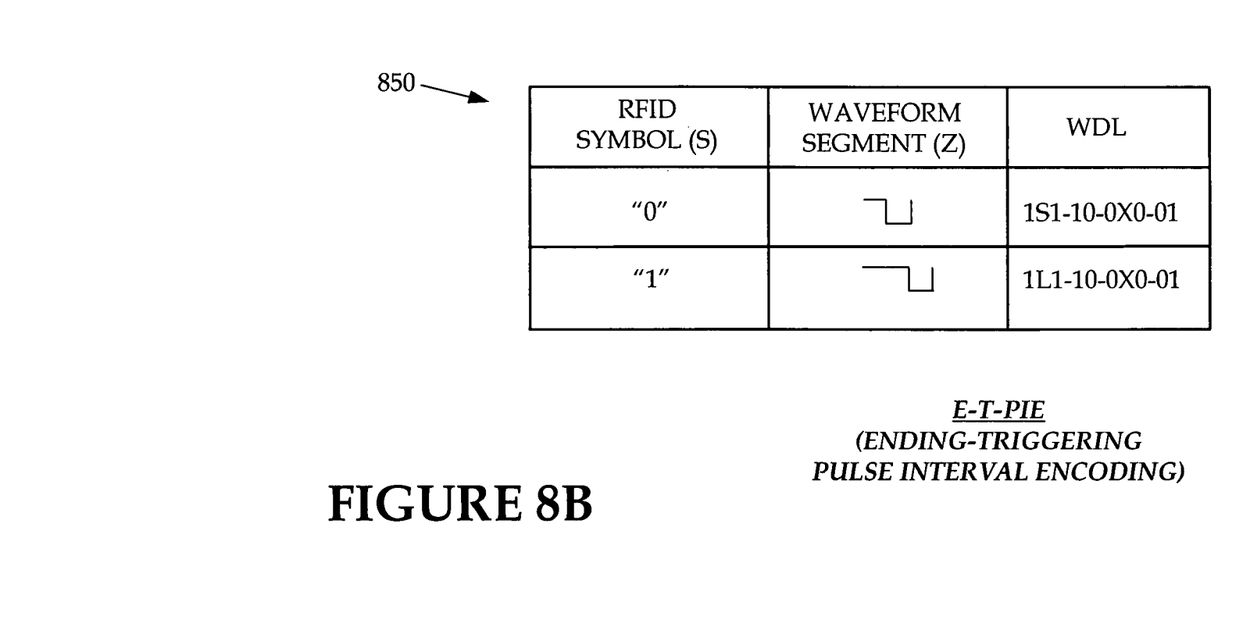
FIG. 8B is a table showing a correspondence according to an embodiment of the invention between symbols such as those of FIG. 5A and waveform segments such as those of FIG. 5B, for encoding and decoding so as to generate the embodiment of FIG. 8A.

FIG. 8B is a table 850 showing a correspondence according to an embodiment of the invention that can achieve the result of group 820. The correspondence of table 850 is also called E-T-PIE, because it is a variation of Pulse Interval Encoding according to the invention.

In FIG. 8B, the segment set has two possible waveforms for two possible symbols, which are encoded the same way every time. For the correspondence of table 850, the ending-triggering transition can be considered a low to high transition, which occurs at the end of the bit period. Alternately, the ending-triggering transition can be considered a high to low transition, after which the pulse terminates either at the next transition, or after a certain pulse length.

Thus, the "0" symbol may be described using WDL in accordance with FIG. 8B as 1S1-10-0X0-01 and the "1" symbol may be described as 1L1-10-0X0-01.

The present invention may be implemented by one or more devices that include logic circuitry. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer. Alternately, the device may be implemented an Application Specific Integrated Circuit (ASIC), etc.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between the method of the invention itself and the method of operating a computing machine. The present invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

It will be appreciated that some of these methods may include software steps which may be performed by different modules of an overall parts of a software architecture. For example, data forwarding in a router may be performed in a data plane, which consults a local routing table. Collection of performance data may also be performed in a data plane. The performance data may be processed in a control plane, which accordingly may update the local routing table, in addition to neighboring ones. A person skilled in the art will discern which step is best performed in which plane.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Figure 9:
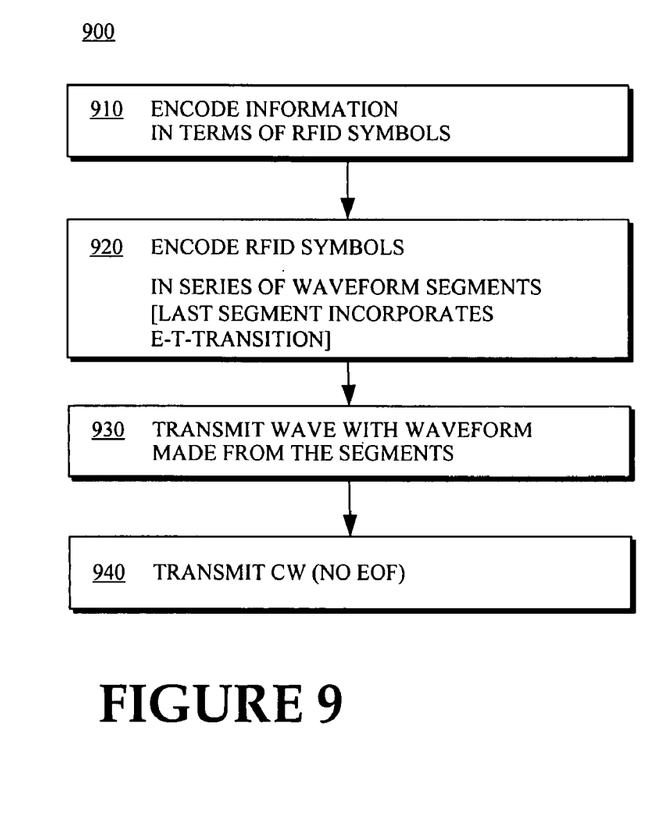
FIG. 9 is a flowchart illustrating an encoding method according to an embodiment of the present invention.

FIG. 9 is flowchart 900 illustrating a method according to an embodiment of the invention. The method of flowchart 900 may be practiced by different embodiments of the invention, including but not limited to the devices shown in FIG. 1.

At block 910, information is encoded in terms of RFID symbols. This may be performed as described with reference to FIG. 5A.

At next block 920, the RFID symbols are encoded into a series of successive waveform segments. The segments individually correspond to the RFID symbols. The last segment incorporates an ending-triggering transition, and terminates in a preset manner with respect to the occurrence of the ending-triggering transition.

At next block 930, a wave is transmitted that has a waveform made from the segments. It is advantageous to precede the waveform of block 930 with a preamble such as preamble PA of FIG. 5C. In particular for the correspondence of FIG. 8B, the preamble will provide an unambiguous starting point.

At optional next block 940, a wave is transmitted, which encodes neither information, nor that the last segment has been transmitted. In the preferred embodiment, the wave transmitted in block 940 is CW.

Figure 10:
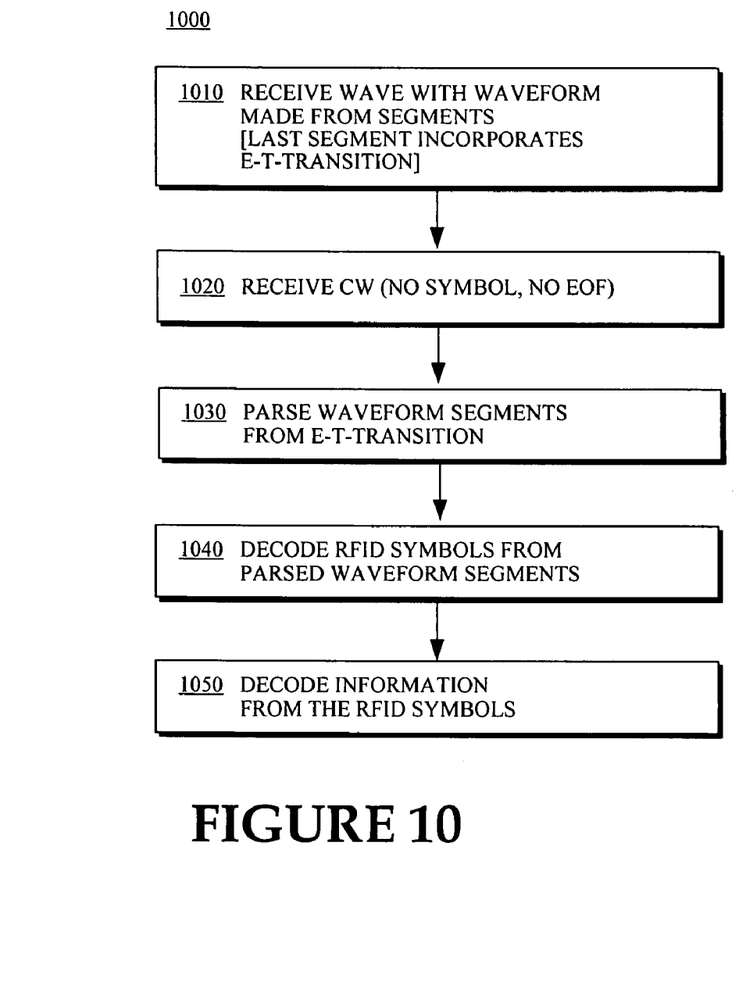
FIG. 10 is a flowchart illustrating a decoding method according to an embodiment of the present invention.

FIG. 10 is flowchart 1000 illustrating a method according to another embodiment of the invention. The method of flowchart 1000 may be practiced by different embodiments of the invention, including but not limited to the devices shown in FIG. 1.

At block 1010, a wave is received, which having a waveform made from successive waveform segments. The last segment incorporates an ending-triggering transition, and terminates in a preset manner with respect to the occurrence of the ending-triggering transition.

At optional next block 1020, a wave is received that encodes neither information, nor that the last segment has been received. The wave of block 1020 could be CW.

At next block 1030, the waveform segments are parsed according to the preset manner and the ending-triggering transition. As also per the above, an ending-triggering transition in a segment can be used to determine when to expect the ending of that segment. That segment is deemed to be the last, after parsing also the wave of block 1020.

At next block 1040, RFID symbols are decoded from the parsed waveform segments.

At next block 1050, information is decoded from the decoded RFID symbols.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

What is claimed is:

1. An RFID reader configured to:
   encode information in terms of RFID symbols;
   encode the RFID symbols into successive waveform segments that individually correspond to the RFID symbols, the last one of the segments incorporating an ending-triggering transition and terminating in a preset manner with respect to the occurrence of the ending-triggering transition; and
   transmit a signal wave having a waveform made from the segments.

2. The reader of claim 1, further configured to:
   transmit a preamble to the signal wave.

3. The reader of claim 1, further configured to:
   transmit a wave that encodes neither information, nor that the last segment has been transmitted.

4. The reader of claim 1, wherein
   the preset manner is that the last segment terminates a preset number of additional transitions after the ending-triggering transition occurs.

5. The reader of claim 1, wherein
   the preset manner is that the last segment terminates upon the occurrence of the ending-triggering transition.

6. The reader of claim 1, wherein
   the preset manner is that the last segment terminates a preset time interval after the transition occurs.

7. The reader of claim 6, wherein
   the interval is a preset fraction of a symbol period.

8. The reader of claim 1, wherein
   the segments belong in a segment set, and
   at least some but not all of the segments in the set incorporate the ending-triggering transition.

9. The reader of claim 1, wherein
   one of the symbols is encoded by one of a plurality of different waveform segments depending on whether there is a next symbol.

10. The reader of claim 1, wherein
    the RFID symbols are encoded so that the RFID symbol for "0" is encoded 10-0X0-01-1X1-10 and the RFID symbol for "1" is encoded (a) 01-1X1-10 if there is a next symbol and that next symbol is a "0" and (b) 01-1X1-10-0X0-01 otherwise.

11. The reader of claim 1, wherein
    the segments belong in a segment set, and
    all of the segments in the set incorporate the ending-triggering transition.

12. The reader of claim 1, wherein
    the RFID symbols are encoded so that the RFID symbol for "0" is encoded 1S1-10-0X0-01 and the RFID symbol for "1" is encoded 1L1-10-0X0-01.

13. An RFID reader configured to:
    receive a signal wave having a waveform made from successive waveform segments, the last one of the segments incorporating an ending-triggering transition and terminating in a preset manner with respect to the occurrence of the ending-triggering transition;
    receive a wave, after reception of the last segment, that encodes neither information nor that the last segment has been received;
    parse the waveform segments according to the preset manner and the ending-triggering transition;
    decode RFID symbols from the parsed waveform segments; and
    decode information from the decoded RFID symbols.

14. The reader of claim 13, further configured to:
    receive a preamble to the signal wave.

15. The reader of claim 13, wherein
    the preset manner is that the last segment terminates a preset number of additional transitions after the ending-triggering transition occurs.

16. The reader of claim 13, wherein
    the preset manner is that the last segment terminates upon the occurrence of the ending-triggering transition.

17. The reader of claim 13, wherein
    the preset manner is that the last segment terminates a preset time interval after the transition occurs.

18. The reader of claim 17, wherein
    the interval is a preset fraction of a symbol period.

19. The reader of claim 13, wherein
    the segments belong in a segment set, and
    at least some but not all of the segments in the set incorporate the ending-triggering transition.

20. The reader of claim 13, wherein
    one of the symbols is decoded from different waveform segments depending on whether there is a next symbol.

21. The reader of claim 13, wherein
    the RFID symbols are decoded so that the RFID symbol for "0" is encoded 10-0X0-01-1X1-10 and the RFID symbol for "1" is encoded (a) 01-1X1-10 if there is a next symbol and that next symbol is a "0" and (b) 01-1X1-10-0X0-01 otherwise.

22. The reader of claim 13, wherein
    the segments belong in a segment set, and
    all of the segments in the set incorporate the ending-triggering transition.

23. The reader of claim 13, wherein
    the RFID symbols are decoded so that the RFID symbol for "0" is encoded 1S1-10-0X0-01 and the RFID symbol for "1" is encoded 1L1-10-0X0-01.

24. An RFID tag configured to:
    encode information in terms of RFID symbols;
    encode the RFID symbols into successive waveform segments that individually correspond to the RFID symbols, the last one of the segments incorporating an ending-triggering transition and terminating in a preset manner with respect to the occurrence of the ending-triggering transition; and
    transmit a signal wave having a waveform made from the segments.

25. The tag of claim 24, further configured to:
    transmit a preamble to the signal wave.

26. The tag of claim 24, further configured to:
    transmit a wave that encodes neither information, nor that the last segment has been transmitted.

27. The tag of claim 24, wherein
    the preset manner is that the last segment terminates a preset number of additional transitions after the ending-triggering transition occurs.

28. The tag of claim 24, wherein
    the preset manner is that the last segment terminates upon the occurrence of the ending-triggering transition.

29. The tag of claim 24, wherein
the preset manner is that the last segment terminates a preset time interval after the transition occurs.
30. The tag of claim 29, wherein
the interval is a preset fraction of a symbol period.
31. The tag of claim 24, wherein
the segments belong in a segment set, and
at least some but not all of the segments in the set incorporate the ending-triggering transition.
32. The tag of claim 24, wherein
one of the symbols is encoded by one of a plurality of different waveform segments depending on whether there is a next symbol.
33. The tag of claim 24, wherein
the RFID symbols are encoded so that the RFID symbol for "0" is encoded 10-0X0-01-1X1-10 and the RFID symbol for "1" is encoded (a) 01-1X1-10 if there is a next symbol and that next symbol is a "0" and (b) 01-1X1-10-0X0-01 otherwise.
34. The tag of claim 24, wherein
the segments belong in a segment set, and
all of the segments in the set incorporate the ending-triggering transition.
35. The tag of claim 24, wherein
the RFID symbols are encoded so that the RFID symbol for "0" is encoded 1S1-10-0X0-01 and the RFID symbol for "1" is encoded 1L1-10-0X0-01.
36. An RFID tag configured to:
receive a signal wave having a waveform made from successive waveform segments, the last one of the segments incorporating an ending-triggering transition and terminating in a preset manner with respect to the occurrence of the ending-triggering transition;
after receiving the last segment, receive a wave that encodes neither information nor that the last segment has been received;
parse the waveform segments according to the preset manner and the ending-triggering transition;
decode RFID symbols from the parsed waveform segments; and
decode information from the decoded RFID symbols.
37. The tag of claim 36, further configured to:
receive a preamble to the signal wave.
38. The tag of claim 36, wherein
the preset manner is that the last segment terminates a preset number of additional transitions after the ending-triggering transition occurs.
39. The tag of claim 36; wherein
the preset manner is that the last segment terminates upon the occurrence of the ending-triggering transition.
40. The tag of claim 36, wherein
the preset manner is that the last segment terminates a preset time interval after the transition occurs.
41. The tag of claim 40, wherein
the interval is a preset fraction of a symbol period.
42. The tag of claim 36, wherein
the segments belong in a segment set, and
at least some but not all of the segments in the set incorporate the ending-triggering transition.
43. The tag of claim 36, wherein
one of the symbols is decoded from different waveform segments depending on whether there is a next symbol.
44. The tag of claim 36, wherein
the RFID symbols are decoded so that the RFID symbol for "0" is encoded 10-0X0-01-1X1-10 and the RFID symbol for "1" is encoded (a) 01-1X1-10 if there is a next symbol and that next symbol is a "0" and (b) 01-1X1-10-0X0-01 otherwise.
45. The tag of claim 36, wherein
the segments belong in a segment set, and
all of the segments in the set incorporate the ending-triggering transition.
46. The tag of claim 36, wherein
the RFID symbols are decoded so that the RFID symbol for "0" is encoded 1S1-10-0X0-01 and the RFID symbol for "1" is encoded 1L1-10-0X0-01.
47. A device comprising:
means for encoding information in terms of RFID symbols;
means for encoding the RFID symbols into successive waveform segments that individually correspond to the RFID symbols, the last one of the segments incorporating an ending-triggering transition and terminating in a preset manner with respect to the occurrence of the ending-triggering transition; and
means for transmitting a signal wave having a waveform made from the segments, wherein
the RFID symbols are encoded so that the RFID symbol for "0" is encoded 10-0X0-01-1X1-10 and the RFID symbol for "1" is encoded (a) 01-1X1-10 if there is a next symbol and that next symbol is a "0" and (b) 01-1X1-10-0X0-01 otherwise.
48. A device comprising:
means for encoding information in terms of RFID symbols;
means for encoding the RFID symbols into successive waveform segments that individually correspond to the RFID symbols, the last one of the segments incorporating an ending-triggering transition and terminating in a preset manner with respect to the occurrence of the ending-triggering transition; and
means for transmitting a signal wave having a waveform made from the segments, wherein
the RFID symbols are encoded so that the RFID symbol for "0" is encoded 1S1-10-0X0-01 and the RFID symbol for "1" is encoded 1L1-10-0X0-01.
49. A method comprising:
encoding information in terms of RFID symbols;
encoding the RFID symbols into successive waveform segments that individually correspond to the RFID symbols, the last one of the segments incorporating an ending-triggering transition and terminating in a preset manner with respect to the occurrence of the ending-triggering transition; and
transmitting a signal wave having a waveform made from the segments,
wherein said encoding the RFID symbols takes place so that the RFID symbol for "0" is encoded 10-0X0-01-1X1-10 and the RFID symbol for "1" is encoded (a) 01-1X1-10 if there is a next symbol and that next symbol is a "0" and (b) 01-1X1-10-0X0-01 otherwise.
50. A method comprising:
encoding information in terms of RFID symbols;
encoding the RFID symbols into successive waveform segments that individually correspond to the RFID symbols, the last one of the segments incorporating an ending-triggering transition and terminating in a preset manner with respect to the occurrence of the ending-triggering transition; and
transmitting a signal wave having a waveform made from the segments, wherein said encoding the RFID symbols takes place so that the RFID symbol for "0" is encoded 1S1-10-0X0-01 and the RFID symbol for "1" is encoded 1L1-10-0X0-01.

51. A device comprising:
means for receiving a signal wave having a waveform made from successive waveform segments, the last one of the segments incorporating an ending-triggering transition and terminating in a preset manner with respect to the occurrence of the ending-triggering transition;
means for, after receiving the last segment, receiving a wave that encodes neither information nor that the last segment has been received;
means for parsing the waveform segments according to the preset manner and the ending-triggering transition;
means for decoding RFID symbols from the parsed waveform segments; and
means for decoding information from the decoded RFID symbols,
wherein said means for decoding RFID symbols is configured to operate so that the RFID symbol for "0" is encoded 10-0X0-01-1X1-10 and the RFID symbol for "1" is encoded (a) 01-1X1-10 if there is a next symbol and that next symbol is a "0" and (b) 01-1X1-10-0X0-01 otherwise.

52. A device comprising:
means for receiving a signal wave having a waveform made from successive waveform segments, the last one of the segments incorporating an ending-triggering transition and terminating in a preset manner with respect to the occurrence of the ending-triggering transition;
means for after receiving the last segment, receiving a wave that encodes neither information nor that the last segment has been received;
means for parsing the waveform segments according to the preset manner and the ending-triggering transition;
means for decoding RFID symbols from the parsed waveform segments; and
means for decoding information from the decoded RFID symbols,
wherein said means for decoding RFID symbols is configured to operate operates so that the RFID symbol for "0" is encoded 1S1-10-0X0-01 and the RFID symbol for "1" is encoded 1L1-10-0X0-01.

53. A method comprising:
receiving a signal wave having a waveform made from successive waveform segments, the last one of the segments incorporating an ending-triggering transition and terminating in a preset manner with respect to the occurrence of the ending-triggering transition;
after receiving the last segment, receiving a wave that encodes neither information nor that the last segment has been received;
parsing the waveform segments according to the preset manner and the ending-triggering transition;
decoding RFID symbols from the parsed waveform segments; and
decoding information from the decoded RFID symbols,
wherein said decoding RFID symbols takes place so that the RFID symbol for "0" is encoded 10-0X0-01-1X1-10 and the RFID symbol for "1" is encoded (a) 01-1X1-10 if there is a next symbol and that next symbol is a "0" and (b) 01-1X1-10-0X0-01 otherwise.

54. A method comprising:
receiving a signal wave having a waveform made from successive waveform segments, the last one of the segments incorporating an ending-triggering transition and terminating in a preset manner with respect to the occurrence of the ending-triggering transition;
after receiving the last segment, receiving a wave that encodes neither information nor that the last segment has been received;
parsing the waveform segments according to the preset manner and the ending-triggering transition;
decoding RFID symbols from the parsed waveform segments; and
decoding information from the decoded RFID symbols,
wherein said decoding RFID symbols takes place so that the RFID symbol for "0" is encoded 1S1-10-0X0-01 and the RFID symbol for "1" is encoded 1L1-10-0X0-01.

55. An RFID tag comprising:
an antenna system adapted to receive a signal wave having a waveform made from successive waveform segments, the last one of the segments incorporating an ending-triggering transition and terminating in a preset manner with respect to the occurrence of the ending-triggering transition, and after receiving the last segment, to receive a wave that encodes neither information nor that the last segment has been received; and
circuitry adapted to:
parse the waveform segments according to the preset manner and the ending-triggering transition;
decode RFID symbols from the parsed waveform segments; and
decode information from the decoded RFID symbols.

56. The tag of claim 55, wherein
the antenna system is further adapted to receive a preamble to the signal wave.

57. The tag of claim 55, wherein
the antenna system is further adapted to then receive a wave that encodes neither information, nor that the last segment has been transmitted.

58. The tag of claim 55, wherein
the preset manner is that the last segment terminates a preset number of additional transitions after the ending-triggering transition occurs.

59. The tag of claim 55, wherein
the preset manner is that the last segment terminates upon the occurrence of the ending-triggering transition.

60. The tag of claim 55, wherein
the preset manner is that the last segment terminates a preset time interval after the transition occurs.

61. The tag of claim 60, wherein
the interval is a preset fraction of a symbol period.

62. The tag of claim 55, wherein
the preset manner is that the last segment terminates when the transition occurs.

63. The tag of claim 55, wherein the circuitry is further adapted so that
one of the symbols is decoded by one of a plurality of different waveform segments depending on whether there is a next symbol.

64. The tag of claim 55, wherein
the segments belong in a segment set, and
all of the segments in the set incorporate the ending-triggering transition.

65. An integrated circuit (IC) for an RFID tag that has an antenna system adapted to receive a signal wave having a waveform made from successive waveform segments, the last one of the segments incorporating an ending-triggering transition and terminating in a preset manner with respect to the occurrence of the ending-triggering transition, and after receiving the last segment, to receive a wave that encodes neither information nor that the last segment has been received, the IC comprising:
  circuitry adapted to:
  parse the waveform segments according to the preset manner and the ending-triggering transition;
  decode RFID symbols from the parsed waveform segments; and
  decode information from the decoded RFID symbols.

66. The IC of claim 65, wherein
the antenna system is further adapted to receive a preamble to the signal wave.

67. The IC of claim 65, wherein
the antenna system is further adapted to then receive a wave that encodes neither information, nor that the last segment has been transmitted.

68. The IC of claim 65, wherein
the preset manner is that the last segment terminates a preset number of additional transitions after the ending-triggering transition occurs.

69. The IC of claim 65, wherein
the preset manner is that the last segment terminates upon the occurrence of the ending-triggering transition.

70. The IC of claim 65, wherein
the preset manner is that the last segment terminates a preset time interval after the transition occurs.

71. The IC of claim 65, wherein
the interval is a preset fraction of a symbol period.

72. The IC of claim 65, wherein
the preset manner is that the last segment terminates when the transition occurs.

73. The IC of claim 65, wherein the circuitry is further adapted so that
one of the symbols is decoded by one of a plurality of different waveform segments depending on whether there is a next symbol.

74. The IC of claim 65, wherein
the segments belong in a segment set, and
all of the segments in the set incorporate the ending-triggering transition.

* * * * *